United States Patent [19]

Fukumoto et al.

[11] Patent Number: 5,367,509
[45] Date of Patent: Nov. 22, 1994

[54] METHOD FOR REPRODUCING INFORMATION RECORDED ON A MAGNETO-OPTICAL RECORDING MEDIUM INCLUDING SERVO CONTROLLING THE DIMENSION OF THE REPRODUCTION REGION OF THE RECORDING MEDIUM BY MEANS OF A RECORDED SIGNAL

[75] Inventors: Atsushi Fukumoto, Kanagawa; Toshiki Udagawa; Shunji Yoshimura, both of Tokyo, all of Japan

[73] Assignee: Sony Corporation, Tokyo, Japan

[21] Appl. No.: 233,555

[22] Filed: Apr. 26, 1994

Related U.S. Application Data

[63] Continuation of Ser. No. 52,221, Apr. 22, 1993, which is a continuation of Ser. No. 832,979, Feb. 10, 1992, abandoned.

[30] Foreign Application Priority Data

Feb. 12, 1991 [JP] Japan .................. 3-040987

[51] Int. Cl.⁵ .............. G11B 13/04; G11B 11/12; G11B 11/10
[52] U.S. Cl. .............................. 369/13; 360/59
[58] Field of Search ............... 369/13; 360/59, 114, 360/60, 66; 365/122

[56] References Cited

U.S. PATENT DOCUMENTS

| | | | |
|---|---|---|---|
| 4,688,203 | 8/1987 | Koishi et al. | 360/116 |
| 4,932,012 | 6/1990 | Kobayashi | 369/13 |
| 5,018,119 | 5/1991 | Aratani et al. | 369/13 |
| 5,168,482 | 12/1992 | Aratani et al. | 369/13 |
| 5,204,847 | 4/1993 | Tayefeh | 360/114 |
| 5,218,581 | 6/1993 | Ohta et al. | 369/13 |

FOREIGN PATENT DOCUMENTS

| | | | |
|---|---|---|---|
| 0359541 | 3/1990 | European Pat. Off. | 360/13 |
| 59-81671 | 5/1984 | Japan | 360/114 |
| 61-260438 | 11/1986 | Japan | 369/13 |
| 61-276149 | 12/1986 | Japan | 360/114 |
| 63-117355 | 5/1988 | Japan | 360/114 |

*Primary Examiner*—Hoa T. Nguyen
*Attorney, Agent, or Firm*—Limbach & Limbach

[57] ABSTRACT

This invention is directed to an improvement in a novel magneto-optical disc reproducing method of the record information erasing type or the record information raised or transfer type wherein a technique is employed to prevent the dimension of an actual reproduction region from varying by a change of temperature or linear velocity of a magneto-optical disc. To realize this, reference information is recorded on a magneto-optical disc to reproduce this reference information prior to actual data reproduction to detect the regenerative RF signal level to control a laser power or an external magnetic field so that the regenerative RF signal level becomes equal to a level optimum for reproduction, thus allowing the dimension of an actual reproduction region to be an optimum fixed dimension at all times. At the time of actual reproduction, control is made so that the controlled laser power or external magnetic field is maintained.

6 Claims, 8 Drawing Sheets

FIG.1A
PRIOR ART
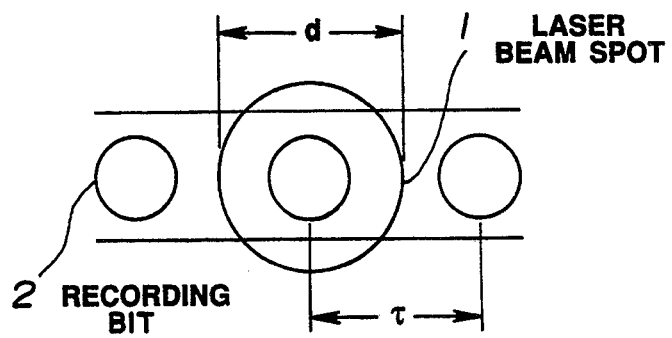
FIG.1B
PRIOR ART
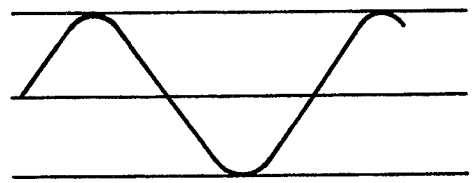
FIG.1C
PRIOR ART
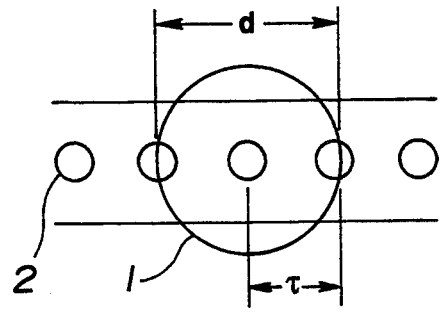
FIG.1D
PRIOR ART DIRECTION OF DISC ROTATION
MASK REGION AT THE TIME OF LOW TEMPERATURE
24
9 REPRODUCTION REGION
22
MASK REGION AT THE TIME OF HIGH TEMPERATURE
2 RECORDING BIT
7 SCANNING SPOT TEMPERATURE
21
23
Tc

METHOD FOR REPRODUCING INFORMATION RECORDED ON A MAGNETO-OPTICAL RECORDING MEDIUM INCLUDING SERVO CONTROLLING THE DIMENSION OF THE REPRODUCTION REGION OF THE RECORDING MEDIUM BY MEANS OF A RECORDED SIGNAL

This is a continuation of co-pending application Ser. No. 08/052,221 filed on Apr. 22, 1993 of ATSUSHI FUKUMOTO ET AL. for A METHOD OF REPRODUCING INFORMATION RECORDED ON A MAGNETO-OPTICAL RECORDING MEDIUM INCLUDING SERVO CONTROLLING THE DIMENSION OF THE REPRODUCTION REGION OF THE RECORDING MEDIUM BY MEANS OF A RECORDED SIGNAL (as amended), which is a continutation of application Ser. No. 07/832,979 of Atsushi Fukumoto et al. filed on Feb. 10, 1992, for METHOD OF REPRODUCING MAGNETO-OPTICAL RECORDING MEDIUM, now abandoned.

BACKGROUND OF THE INVENTION

This invention relates to a method of reproducing a magneto-optical medium, and more particularly to a method of reproducing a magneto-optical disc, which can record/reproduce information at high density.

A magneto-optical disc which can rewrite an information signal includes a magnetic thin film. By irradiating a laser beam to this film to heat it, the direction of magnetization at the heated portion (recording bit) is caused to be in correspondence with an external magnetic field corresponding to recording information, thus to carry out recording of information. On the other hand, in the case of reproduction, a laser beam is irradiated onto a track of the recording bit to carry out reproduction by making use of the Kerr effect that the plane of polarization of a reflected light rotates by the direction of magnetization. In the case where a magneto-optical disc is of a structure including two layers or more having a reflection film in addition to the magnetic thin film, the Faraday effect is also utilized.

The track recording density of information on a magneto-optical disc is determined by the carrier to noise ratio, i.e. C/N of a regenerative signal. In a conventional typical magneto-optical recording and reproduction, as shown in FIG. 1A, the entirety of the area of a beam spot 1 which is a light irradiation area by a laser beam on a magneto-optical disc is caused to be a regenerative signal detection area. For this reason, the reproducible track recording density is determined by the diameter of the laser beam spot.

For example, if the diameter d of the laser beam spot 1 is smaller than the pitch $\tau$ of recording bits 2 as shown in FIG. 1A, there is no possibility that two recording bits fall within the spot 1. In this case, the reproduced output waveform is as shown in FIG. 1B. Thus, a regenerative signal can be read. In contrast, in the case where recording bits are formed at high density and the diameter d of the laser beam spot 1 is greater than the pitch $\tau$ of the recording bits 2 as shown in FIG. 1C, two recording bits 2 concurrently fall within the spot 1, so the reproduced output waveform is fixed as shown in FIG. 1D. For this reason, it is impossible to separately reproduce those two recording bits, resulting in reproduction unable state.

The spot diameter d is dependent upon the wavelength $\lambda$ of a laser beam and the numerical aperture NA of an object lens. In view of this, in the prior art, a device or scheme is made such that a laser beam having a short wavelength $\lambda$ is used, or the numerical aperture NA of the object lens is increased to thereby reduce the spot diameter d of the laser beam, thus to allowing the recording density to be high. However, such a scheme has a limit because of the problem of a laser light source and/or the problem of an optical system. Therefore, this is an obstacle to implementation for allowing the recording density to be higher.

Further, the track density is also limited by crosstalk mainly from adjacent tracks. In the case of the prior art, a quantity of this crosstalk is also dependent upon the laser beam spot diameter d. Similarly, this is an obstruction to realization of high density recording.

The applicant of this application has already proposed a magneto-optical disc and a method of reproducing the same such that the readable track recording density and the track density are permitted to be high without alteration of the laser beam spot diameter.

In accordance with one system thereof, as described in U.S. Pat. No. 5,018,119, a magneto-optical disc including a multi-layer film comprised of a recording layer 3, an intermediate layer 4, and a reproduction layer 5 formed in a stacked manner as shown in FIG. 2A. The recording layer 3, the intermediate layer 4 and the reproduction layer 5 are constituted by materials having the Curie temperatures of 300° C., 120° C. and more than 400° C., respectively.

In the case of this magneto-optical disc, in the state of a room temperature prior to reproduction, the recording layer 3, the intermediate layer 4 and the reproduction layer 5 are magnetically coupled in a state of magnetostatic coupling or exchange coupling as shown in FIG. 2A, and the magnetic polarities of the recording bits of the recording layer 3 are all transferred to the reproduction layer 5. In the figure, arrows indicate directions of magnetization.

At the time of reproduction, as shown in FIG. 2B, a laser beam 6 is irradiated on the magneto-optical disc, and a predetermined reproducing magnetic field Hre is applied thereto. In the magneto-optical disc, as shown in FIG. 2C, by irradiation of the laser beam 6, there takes place a region 8 in which the temperature in the layers 3, 4 and 5 becomes equal to more than the Curie Point of the intermediate layer 4. At this time, since the magneto-optical disc rotates at a high speed, this high temperature region 8 would be a region shifted in a rotation direction by a quantity corresponding to a moving velocity (linear velocity) of the magneto-optical disc with respect to the position of a scanning spot 7 of the irradiation laser beam 6.

In the high temperature region (mask region) 8, since the temperature of the intermediate layer 4 is above its Curie point Tc, the magnetic property of the intermediate layer 4 is lost as shown in FIG. 2B. Thus, the magnetic coupling between the recording layer 3 and the reproduction layer 5 at the portion of this region 8 is annihilated. As a result, magnetization of the reproduction layer 5 is in correspondence with the direction of the reproducing magnetic field Hre. Namely, recording bits of the reproduction layer 5 in the high temperature region 8 are erased. Thus, a region 9 except for the region overlapping with the high temperature region 8 of the region of the scanning spot 7 serves as a reproduction region. Namely, the scanning spot 7 of a laser beam is partially masked by the high temperature region 8. Thus, a small area which is not masked serves as the reproduction area 9. Note that this small area is smaller in diameter than the pitch between the magnetic bits 2.

Since reproduction of bits is carried out by detecting a Kerr rotational angle of a reflected light from the small reproduction area 9 where the scanning spot 7 of a laser beam is not masked by the mask region 8, there results the effect equivalent to the fact that the spot diameter d of the laser beam spot 7 is reduced. Thus, the track recording density and the track density can be improved.

The above-mentioned reproducing method is called a reproducing method of the erasing type.

Further, the applicant of this application has also proposed another system. This system is described in the Japanese Patent Application No. 229395/89 (corresponding to U.S. Pat. No. 5,168,482).

A magnetic thin film of a magneto-optical disc of this system is in principle comprised of a stacked film of a recording film and a reproduction layer. In this case, the recording layer and the reproduction layer can be subjected to magnetostatic coupling or magnetic exchange coupling. The Curie point of the reproduction layer is lower than that of the recording layer.

In accordance with this system, an approach is employed in principle to apply an initialization magnetic field to a magneto-optical disc prior to reproduction to allow the direction of magnetization of the reproduction layer to be in correspondence with the direction of the initialization magnetic field, thus to erase recording bits of the reproduction layer. The magnitude of the initialization magnetic field Hin is set to a value greater than the magnitude of a magnetic field Hcp required for reversing the polarity of the magnetization of the reproduction layer (Hin>Hcp), and sufficiently smaller than the magnitude of a magnetic field Hcr required for reversing the polarity of the magnetization of the recording layer (Hin<<Hcr).

In the case of reproduction, in a state initialized as described above, a laser beam is irradiated onto the magneto-optical disc. In the same manner as in the previously described case, the disc temperature of a region (corresponding to the region 8 of FIG. 2C) shifted with respect to the scanning spot position in a rotation direction in dependency upon a rotation moving velocity (linear velocity) of the magneto-optical disc becomes higher than a predetermined temperature Ts. Thus, since the coercive force in that region of the reproduction layer becomes small, the magnetization of the recording bits are transferred only into the region of the reproduction layer in which the temperature is higher than the predetermined temperature Ts. By detecting a Kerr rotation angle of a plane of polarization of a reflected light from a region overlapping with a laser beam spot of the recording bits area, reproduction is carried out.

In the case of this system, the region except for the region, which has a temperature higher than the predetermined temperature Ts of the region of the scanning spot of a laser beam, is a so called a mask region where no recording bit appears. The portion where the high temperature region and the beam spot region overlap with each other serves as a reproduction region. Since this region is both smaller than the spot diameter and the pitch between the bits, the track recording density and the track density can be caused to be high.

It is to be noted that, in practice, in order to stably hold the initialized state of the reproduction layer and to satisfactorily carry out transfer of the magnetization directions of the recording bits from the recording layer at the time of reproduction, a magneto-optical film of four layers as shown in FIG. 3 is formed in the disc.

Namely, the magneto-optical disc includes a stacked film of four layers of a recording layer 11, an intermediate layer 12, a reproduction auxiliary layer 13, and a reproduction layer 14. The Curie temperatures of the recording layer 11, the intermediate layer 12, the reproduction auxiliary layer 13, and the reproduction layer 14 are set to, e.g., 250° C., 250° C., 120° C. and more than 300° C., respectively.

The recording layer 11 is the layer for holding recording bits without being affected by the initialization magnetic field, the reproduction magnetic field, or the reproduction temperature, etc., and has a sufficient coercive force at a room temperature or a reproduction temperature Ts.

The vertical anisotropy of the intermediate layer 12 is small as compared to those of the reproduction auxiliary layer 13 and the recording layer 12. For this reason, a magnetic domain wall formed between the reproduction layer 14 and the recording layer 11 stably exists in the intermediate layer 12. For this reason, the reproduction layer 14 and the reproduction auxiliary layer 13 stably maintain an erased state (initialized state).

The reproduction auxiliary layer 13 serves to enhance the coercive force of the reproduction layer 14 at a room temperature. For this reason, magnetization of the reproduction layer 14 and the reproduction auxiliary layer 13, of which directions are caused to be in correspondence with each other by the initialization magnetic field, stably exists even if magnetic domain walls exist. Further, the coercive force of the reproduction auxiliary layer 13 abruptly becomes small at about the reproduction temperature Ts at the time of reproduction. For this reason, magnetic domain walls confined within the intermediate layer 12 extend to the reproduction auxiliary layer 13 to finally reverse the reproduction layer 14, thus allowing the magnetic domain walls to disappear. By this process, the magnetization directions of the recorded bits is transferred to the reproduction layer 14.

The magnetization reversal magnetic field Hcp of the reproduction layer 14 is small even at a room temperature, and magnetization is easily reversed. For this reason, the directions of magnetization at the entire surface of the reproduction layer 14 are in correspondence with each other. The magnetization of which directions are caused to be the same is supported by the reproduction auxiliary layer 13, and stable state thereof is kept even in the case where magnetic domain walls exist between the reproduction auxiliary layer 13 and the recording layer 11. As previously described, at the time of reproduction, magnetic domain walls between the reproduction auxiliary layer 13 and the recording layer 11 disappear. Thus, the magnetization directions of the recording bits in the recording layer 11 are transferred to the reproduction layer 14.

In carrying out an actual reproduction, initialization of the reproduction layer 14 and the reproduction auxiliary layer 13 is carried out by the initialization magnetic field Hin prior to reproduction as shown in FIG. 4A. At this time, magnetic domain walls (indicated by arrows in a lateral direction in FIG. 4A) stably exist in the intermediate layer 12, thus, the reproduction layer 14 and the reproduction auxiliary layer 13 stably maintain the initialized state.

Then, as shown in FIGS. 4B and 4C, a laser beam 15 is irradiated onto a track of a recording bit, and a reproduction magnetic field Hre is applied thereto. For this reproduction magnetic field Hre, a magnetic field having strength greater than that of a magnetic field for reversing the reproduction layer 14 and the reproduction auxiliary layer 13 and for allowing magnetic domain walls of the reproduction auxiliary layer 13 to disappear is required. However, this magnetic field is required to have a strength limited to such an extent that the reproduction layer 14 and the reproduction auxiliary layer 13 do not reverse their directions of magnetization.

By temperature elevation by irradiation of the laser beam 15, in the same manner as previously described, at the portion shifted in a rotation direction of the magneto-optical disc with respect to the beam scanning spot 16, there is created a high temperature region 17 where the temperature is above the reproduction temperature Ts. As a result, the coercive force at the portion of the reproduction auxiliary layer 13 in that region 17 (the portion to which slanting lines are attached in FIG. 4C) is lowered. Since the reproduction magnetic field Hre is smaller than the exchange coupling forces between the recording layer 11 to the reproduction layer 14, magnetic domain walls at that portion disappear. As a result, the magnetization directions of the recording bits of the recording layer 11 are transferred to the reproduction layer, so corresponding bits are produced in the reproduction layer 14. Thus, the region 18 overlapping with the high temperature region 17 of the region of the scanning spot 16 serves as a reproduction region in substance. Namely, the region except for the region 18 overlapping with the high temperature region 17 of the region of the scanning spot 16 of a laser beam is masked. Thus, this overlapping region 18 serves as a reproduction region.

Since reproduction of bits is carried out by detecting a Kerr rotation angle of a reflected light from the small reproduction region 18 where the scanning spot 16 of a laser beam and the high temperature region 17 overlap with each other, there results the effect equivalent to the fact that the spot diameter d of the laser beam spot 16 is reduced to less than the pitch between the bits. Thus, the track recording density and the track density can be caused to be high.

The above-mentioned reproducing method is called herein a reproducing method of the high temperature region type.

In a manner stated above, the track recording density and the track density can be caused to be high without reducing the diameter of the laser beam scanning spot. However, even if the external reproduction magnetic field is fixed and the laser beam power is fixed, the dimensions of the reproduction regions 9 and 18 in the respective reproducing methods would vary in dependency upon a temperature change or a linear velocity change of the magneto-optical disc.

For example, in the reproducing method of the erasing type, in the case where the temperature of a magneto-optical disc is high, the temperature distribution state is such that it shifts in a higher temperature direction as indicated by the curve 21 of FIG. 5B. For this reason, the high temperature mask region above the Curie temperature Tc becomes a region 22 as shown in FIG. 5A. Thus, the substantial reproduction region 9 is reduced.

Further, in the case where the temperature of the magneto-optical disc is low, the temperature distribution state is such that it shifts in a lower temperature direction as indicated by the curve 23 in FIG. 5B. For this reason, the high temperature region above the Curie temperature Tc becomes a region 24 of FIG. 5A. Thus, the substantial reproduction region 9 becomes large.

On the other hand, in the case of the high temperature type, as apparent from the principle, in the case where the temperature of the magneto-optical disc is high, the reproduction region becomes large, while in the case where the magneto-optical disc temperature is low, the reproduction region becomes small.

Further, for example, in the reproducing method of the erasing type, in the case where the linear velocity is low, the transit time of the scanning spot 7 per unit movement distance is prolonged. For this reason, as indicated by the curve 25 in FIG. 6B, the temperature distribution state by laser beam irradiation is such that the high temperature mask region above the Curie temperature Tc becomes broad as indicated by the region 26 in FIG. 6A. Thus, the substantial reproduction region 9 becomes small.

In contrast, in the case where the linear velocity is high, since the transit time of the scanning spot 7 per unit movement distance is short by indicated by the curve 27 in FIG. 6B, the temperature distribution state by laser beam irradiation is such that the high temperature region above the Curie temperature Tc is narrowed as indicated by the region 28 in FIG. 6A, the substantial reproduction region 9 becomes large.

On the other hand, in the case of the high temperature type, as apparent from the principle thereof, in the case where the linear velocity of the magneto-optical disc is low, the reproduction region becomes large, while in the case where the linear velocity of the magneto-optical disc is high, the reproduction region becomes small.

As understood from the above discussion, if the temperature of the magneto-optical disc changes by a changes of an environmental temperature therearound, or the linear velocity of the magneto-optical disc varies in dependency upon the reproducing position, the dimension (area) of the substantial reproduction region 9 or 18 at the time of reproduction would vary. For this reason, a stable reproduction having good C/N cannot be conducted.

In addition, in the case where the track recording density of the magneto-optical disc changes, it is advantageous for carrying out reproduction of satisfactory C/N that the dimension of an optimum reproduction region is varied in dependency upon the track recording density.

Namely, in the reproducing method of the erasing type or the high temperature type, in the case where the track recording density is low, the pitch interval of recording bits is long. For this reason, in order to carry out reproduction having good C/N, it is desirable that the reproduction region 9 or 18 is large. On the other hand, in the case where the track recording density is high, the recording bit interval become short. For this reason, in order to carry out reproduction of good C/N, it is desirable that the reproduction region 9 or 18 is narrow. Accordingly, even if information is recorded on a magneto-optical disc at a fixed track recording density, in the case where the track recording density varies according to the kind of magneto-optical discs, it is advantageous to effect a control to allow the dimension of the reproduction region 9 or 18 to take an optimum value in dependency upon the track recording density.

OBJECT AND SUMMARY OF THE INVENTION

With the above in view, an object of this invention is to provide a reproducing method wherein even if there is any temperature change in a magneto-optical disc, the track recording density or the linear velocity changes according to the kind of magneto-optical discs, or there is any linear velocity change corresponding to the reproducing position on a magneto-optical disc, this method allows the dimension of the substantial reproduction region to be fixed, thus making it possible to stably read out information, and to allow the dimension of the reproduction region to be an optimum dimension corresponding to the recording density of a magneto-optical disc.

To achieve the above-described object, this invention provides a method of carrying out reproduction from a magneto-optical disc to which a reproducing method of the erasing type is applied, wherein reference information is recorded onto the magneto-optical disc to be read out from the magneto-optical disc prior to reproduction to allow detection of the level of a regenerative signal thereof to control the dimension of the magnetic coupling extinct region at the time of reproduction on the basis of the detected level.

Further, there is also provided a method of carrying out reproduction from a magneto-optical disc to which a reproducing method of the high temperature type is applied, wherein reference information is recorded onto the magneto-optical disc to be read out from the magneto-optical disc prior to reproduction to allow detection of the level of a regenerative signal thereof to control the dimension of the high temperature region at the time of reproduction on the basis of the detected level.

A regenerative signal of reference information from a magneto-optical disc has a signal level corresponding to the dimension of a reproduction region in the reproducing method of the erasing type or the high temperature type. Accordingly, by controlling, on the basis of the regenerative signal level, the dimension of the reproduction region so that, e.g., the regenerative signal level takes a predetermined value, the dimension of the reproduction region can be a fixed value optimum for reproduction. Thus, reproduction with good C/N can be stably carried out.

Namely, in accordance with this invention, in a reproducing method of the erasing type or a reproducing method of the high temperature type, the reproduced signal level of reference information is caused to be an optimum level, thus to allow control of the dimension of the reproduction region in the reproducing method of the erasing type or the high temperature type. For this reason, even in the case where there is any temperature change according to the kind of magneto-optical discs, or the linear velocity and the track recording density vary, reproduction can be stably carried out at all times. Accordingly, a regenerative signal of good C/N and good quality can be provided at all time.

BRIEF DESCRIPTION OF THE DRAWINGS

FIGS. 1A, 1B, 1C, 1D are views for explaining the relationship between a laser beam spot diameter and the recording density of reproducible recording bits.

DESCRIPTION OF THE PREFERRED EMBODIMENTS

Figure 7:
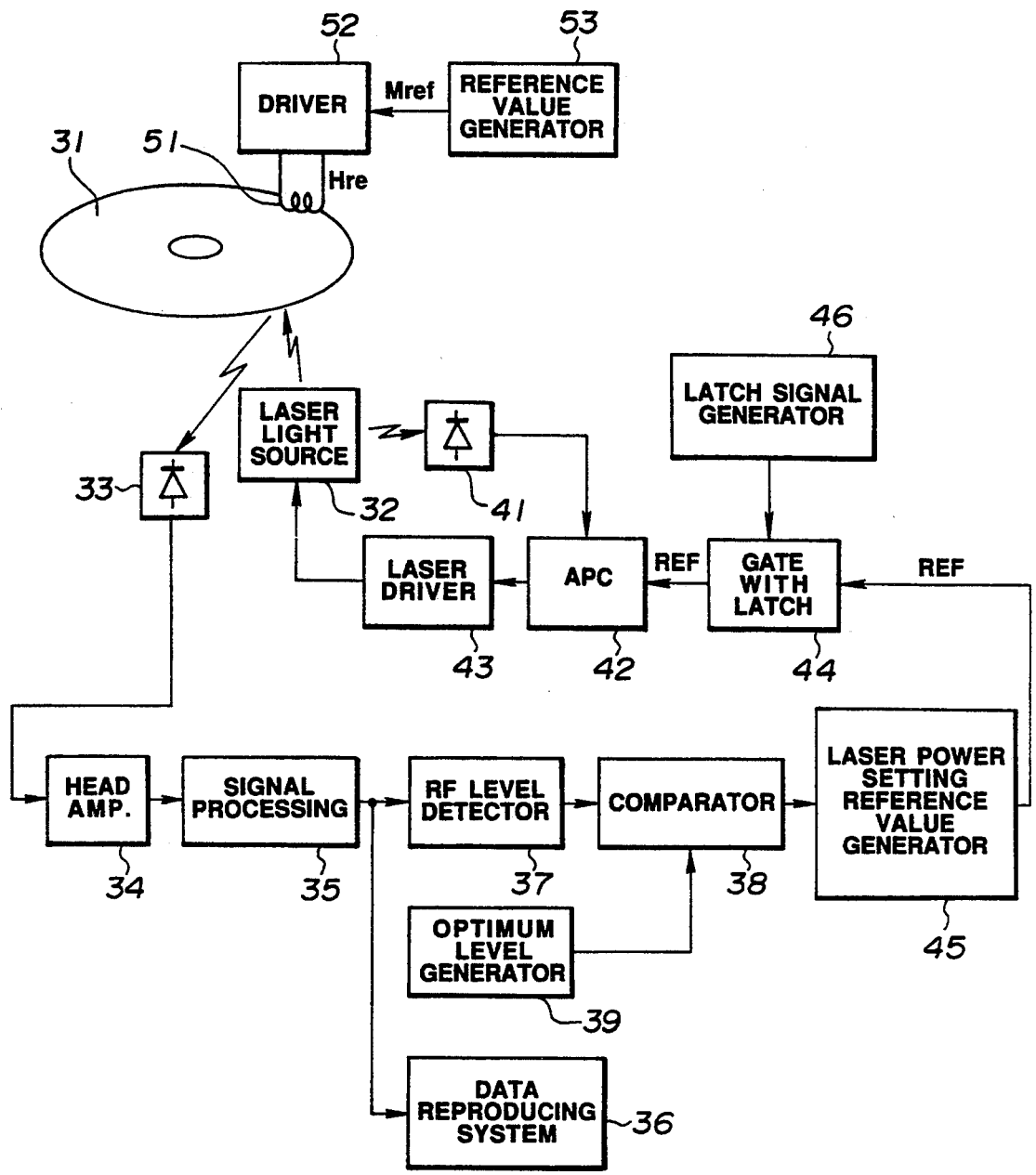
FIG. 7 is a block diagram showing an embodiment of a disc reproducing apparatus to which a reproducing method according to this invention is applied.

FIG. 7 shows an embodiment of the essential part of an apparatus for reproducing a magneto-optical disc to which a reproducing method according to this invention is applied.

In FIG. 7, reference numeral 31 represents a magneto-optical disc to which the previously described reproducing method of the erasing type or the high temperature type is applied. In the case of this example, the magneto-optical disc 31 is rotationally driven at a constant angular velocity (CAV) or a constant linear velocity (CLV).

As a magneto-optical disc to which the reproducing method of the erasing type is applied, there is used a magneto-optical disc in which, e.g., the recording layer is comprised of TbFeCo having the Curie temperature of 300° C., the intermediate layer is comprised of TbFeCoAl having the Curie temperature of 120° C., and the reproduction layer is comprised of GbFeCo having the Curie temperature of more than 400° C. Further, as a magneto-optical disc to which the reproducing method of the high temperature type is applied, there is used a magneto-optical disc in which, e.g., the recording layer is comprised of TbFeCo having the Curie temperature of 250° C., the intermediate layer is comprised of GbFeCo having the Curie temperature of 250° C., the reproduction auxiliary layer is comprised of TbFeCoAl having the Curie temperature of 120° C., and the reproduction layer is comprised of GbFeCo having the Curie temperature of more than 300° C.

In this case, at a portion of, e.g., the innermost circumferential portion for recording control information, etc. of the magneto-optical disc 31, or portions except for the innermost or outermost circumferential data recording area, reference information comprised of, e.g., fixed repetitive patterns is recorded. As the reference information, an information pattern for setting the reproduction region 9 or 18 optimum for reproduction of the magneto-optical disc is used. For example, in that magneto-optical disc, a repetitive pattern of the maximum recording density, e.g., "1111 . . . " or "101010 . . . ", etc. may be used. Which pattern is used is dependent upon the recording modulation system for digital data.

In FIG. 7, reference numeral 32 represents a laser light source. A laser beam from the laser light source 32 is incident to the reproduction layer of the magneto-optical disc 31.

In the case of this example, a reproduction magnetic field Hre is produced as the result of the fact that a drive current is delivered from a driver 52 to a magnetic generation coil 51. The magnetic field generation coil 51 is provided at the position opposite to the laser light source 32 on the plane surface opposite to the plane surface to which a laser beam is irradiated of the magneto-optical disc 31. A reference value Mref is delivered from a reference value generation circuit 53 to the driver 52. Thus, the magnitude of the reproduction magnetic field Hr generated from the magnetic field generation coil 51 is caused to be a predetermined fixed value corresponding to the above reference value.

By the previously described reproducing method of the erasing type or the high temperature type, a reflected light from the reproduction region 9 or 18 of a laser beam scanning spot is incident to a reproducing photodetector 33 through an optical system (not shown), and is subjected to electro-optical conversion thereat.

An output signal from the photodetector 33 is delivered to a signal processing circuit 35 through a head amplifier 34, resulting in a RF signal. This RF signal is delivered to a data reproducing system 36, at which it is demodulated.

Further, a portion of a laser beam from the laser light source 32 is incident to a photodetector 41 for monitoring a laser power. An electro-optical conversion output from the photodetector 41 is delivered to an automatic power controller 42. At the automatic power control let 42, an output from the photodetector 41 and a regenerative laser power setting reference value REF from a gate circuit 44 with latch which will be described later are compared. Its compared error output is delivered to a laser driver 43. Thus, the output power of the laser light source 32 is controlled. Namely, by the above-mentioned closed loop control, the output power of the laser light source 32 is controlled so that it becomes equal to a value corresponding to the regenerative laser power setting reference value REF.

In the case of this example, the regenerative laser power setting reference value REF is set to a value such that the output laser power of the laser light source 32 becomes equal to a value at which the reproduced output level of reference information becomes in correspondence with an optimum level. Namely, the laser output power is controlled in dependency upon the reproduced output level of the reference information. Thus, the dimension of the reproduction region 9 or 18 is controlled so that it takes a predetermined value.

Figure 8:
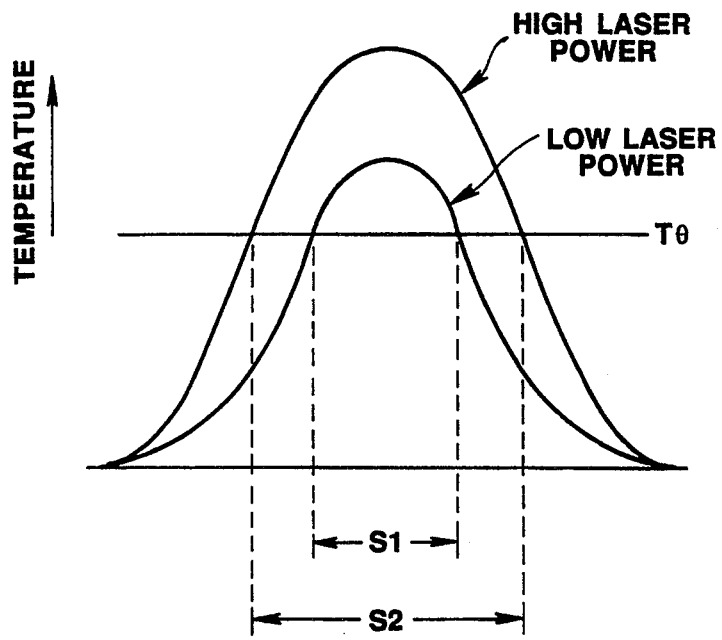
FIG. 8 is a view for explaining that the mask region is varied by changing a laser power.

As previously described, the temperature distribution state on a magneto-optical disc by laser beam irradiation shifts in dependency upon the disc temperature or the linear velocity. However, when the laser output power changes, even if the temperature of the magneto-optical disc 31 is fixed, the dimension of the region above a predetermined threshold temperature TΘ change as indicated by S1 or S2 as shown in FIG. 8. This region is the previously described mask region 8 or the high temperature region 17. Accordingly, by controlling the laser power as stated above, even if the temperature, the linear velocity or the track recording density of the photomagnetic detector 31 varies, the dimensions of the reproduction regions 9 and 18 can be caused to be a predetermined value.

Setting of the regenerative laser power setting reference value REF corresponding to a reproduced output level or reference information will be made as described below.

Namely, prior to actual data reproduction, the reference information of the magneto-optical disc 31 is read out. At this time, a regenerative signal of the reference information provided from the photodetector 33 is delivered to a RF level detector 37 through the head amplifier 34 and the signal processing circuit 35. The RF level thus detected is delivered to a level comparator 38, and is compared with an optimum RF level from an optimum level generator 39. A compared error signal from the comparator 38 is delivered to a regenerative laser power setting reference value generator 45. The regenerative laser power setting reference value generator 45 outputs a value described below as the regenerative laser power setting reference value REF. Namely, when the compared error is equal to zero, this generator 45 outputs a predetermined value determined in advance, and when the compared error takes other values, this generator 45 outputs a value varying with the predetermined value being as center in dependency upon the polarity of that compared error and an absolute value thereof.

This regenerative laser power setting reference value REF from the regenerative laser power setting reference value generator 45 is delivered to an automatic power controller 42 through the gate circuit 44 with latch. In the setting mode of the regenerative laser power setting reference value REF, the gate circuit 44 is in a gate opened state. Accordingly, in the setting mode of the regenerative laser power setting reference value REF, a closed loop from the photodetector 33 to the laser light source 32 is formed. Thus, the output laser power of the laser light source 32 is controlled so that it becomes equal to a value at which the reproduced output level of reference information is in correspondence with an optimum level.

When the setting mode of the regenerative laser power setting reference value REF is released, a latch signal is produced from a latch signal generator 46 at the time point immediately before that releasing. By this latch signal, a regenerative laser power setting reference value REF at which the reproduced output level of reference information becomes equal to an optimum level is latched at the gate circuit, 44. Accordingly, at, the time of reproduction of actual data which will be subsequently conducted, that latched regenerative laser power setting reference value REF is used. Thus, control of the output power of the laser light, source 32 is carried out.

While the setting mode of the regenerative laser power setting reference value REF may be manually carried out, the setting mode may be necessarily automatically set, e.g., prior to actual data reproduction at the reproduction starting point. Further, every a predetermined time interval, e.g., 10 minutes during which it is considered that, alteration of setting of the regenerative laser power setting reference value REF is required because of any temperature change which may occur during reproduction, or for other reasons, automatic shift to this setting mode may be temporarily conducted.

While, in the above-mentioned example, an approach is employed to control the laser power to allow the dimensions of the reproduction regions 9 and 18 to be an optimum fixed dimension, if an approach is employed to control an external magnetic field (reproduction magnetic field Hre), the same effects and/or advantages can be provided.

Figure 2A:
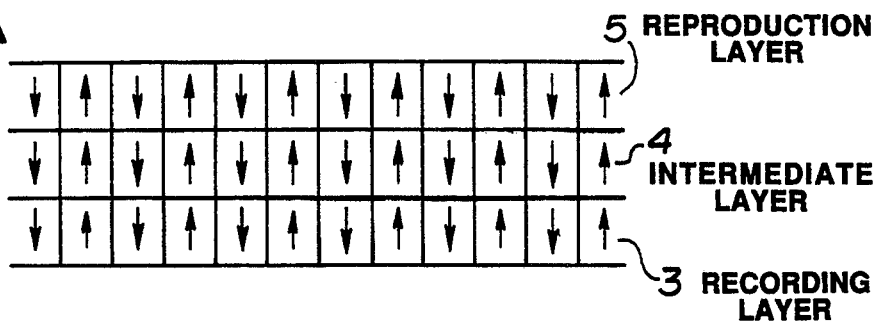
FIGS. 2A, 2B, 2C, are views for explaining a reproducing method of the erasing type and a substantial reproduction region of a magneto-optical disc therefor.
Figure 2B:
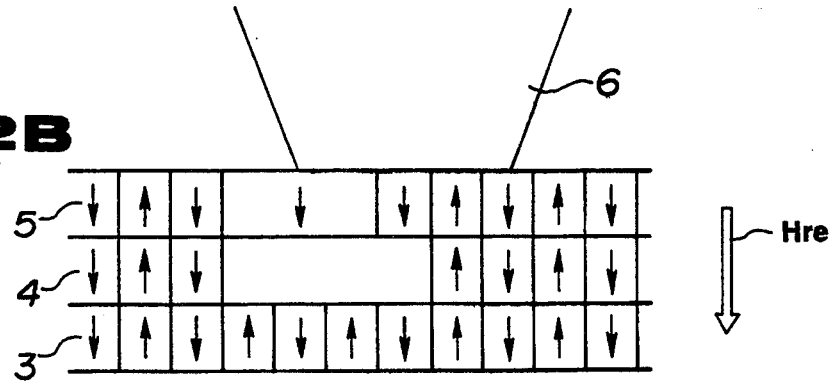
Figure 2C:
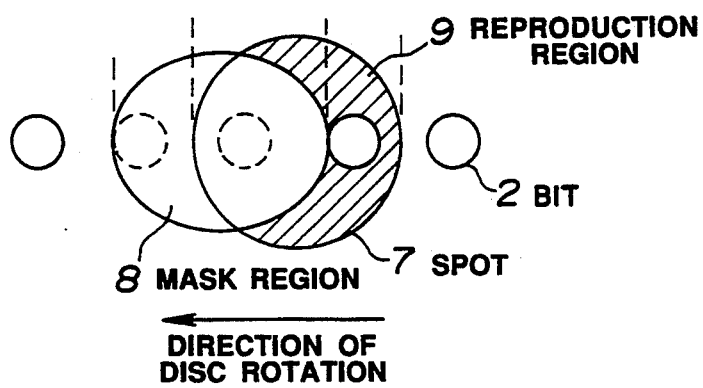
Figure 3:
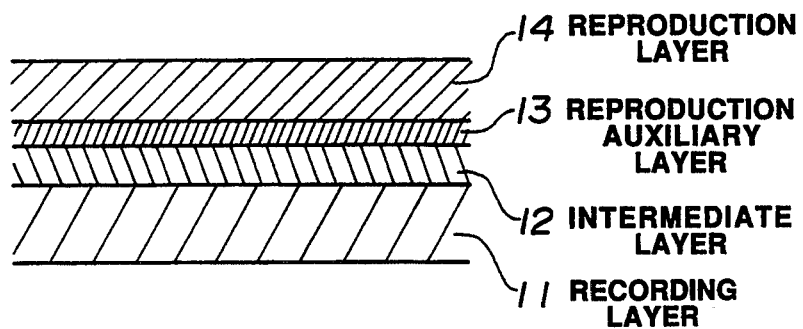
FIG. 3 is a view showing an example of a magneto-optical disc for a reproducing method of the high temperature type.
Figure 4A:
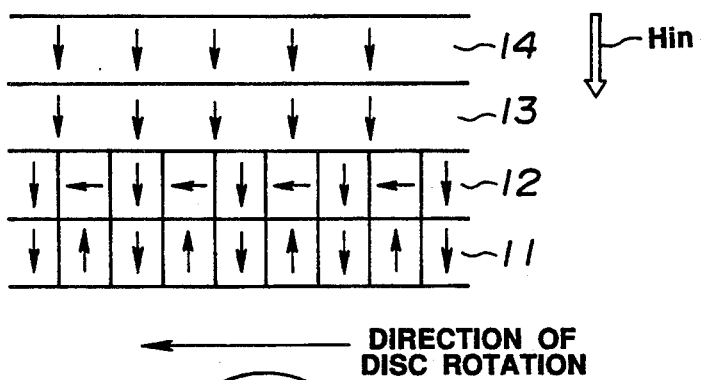
FIGS. 4A, 4B, 4C are views for explaining a reproducing method of the high temperature type and a substantial region of a magneto-optical disc therefor.
Figure 4B:
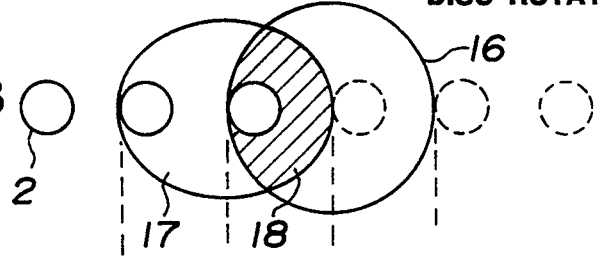
Figure 4C:
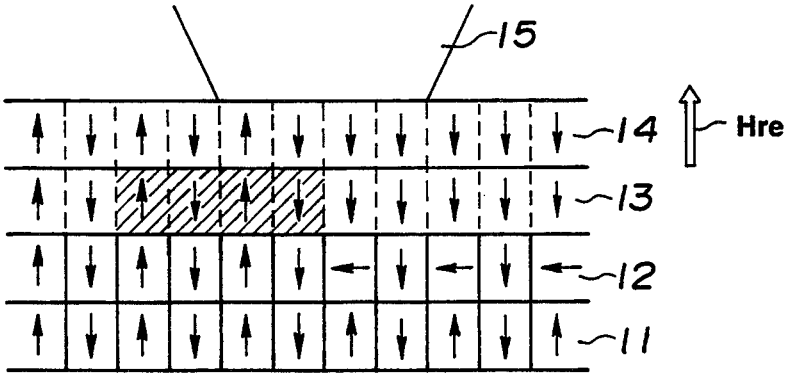
Figure 5A:
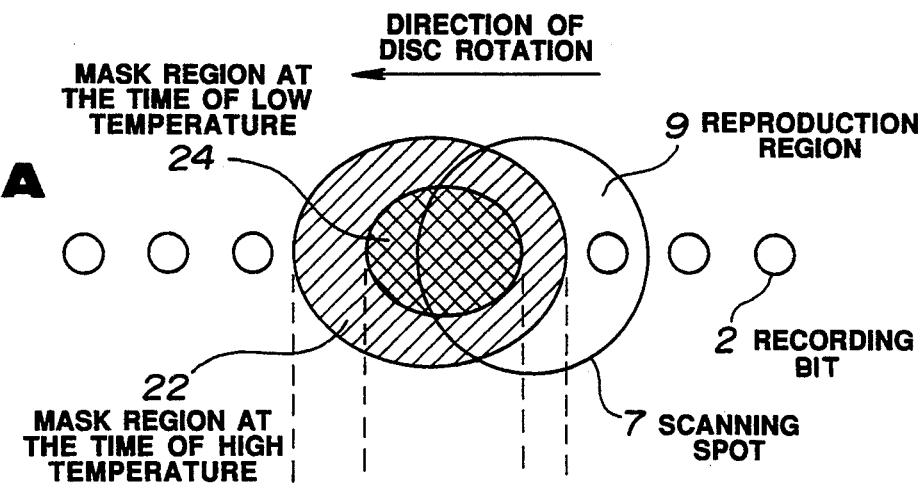
FIGS. 5A, 5B are views for explaining that a substantial reproduction, region varies by a temperature change of a magneto-optical disc.
Figure 5B:
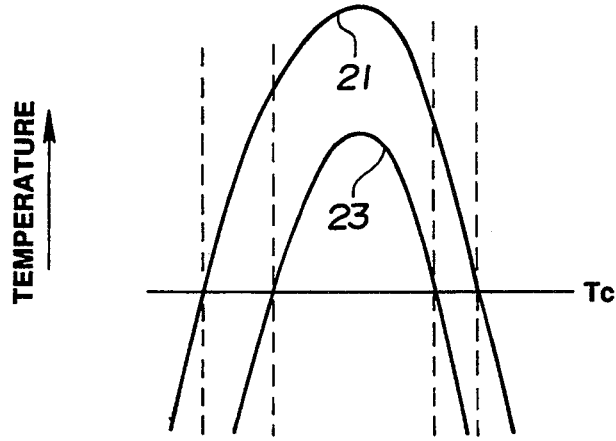
Figure 6A:
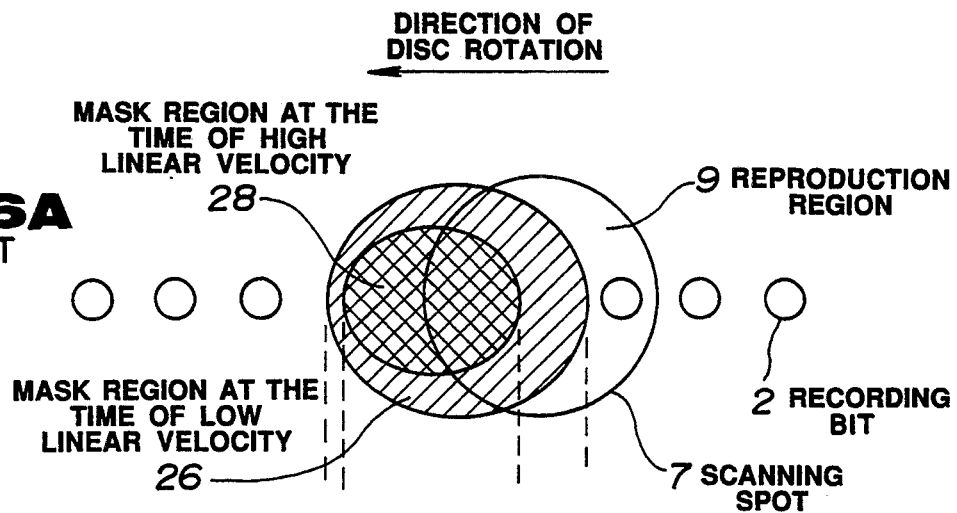
FIGS. 6A, 6B are views for explaining that a substantial reproduction region varies by a linear velocity change of a magneto-optical disc.
Figure 6B:
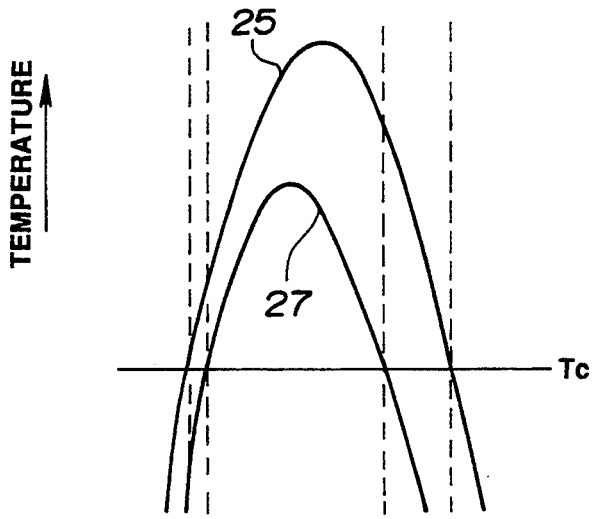

Namely, e.g., in the case where consideration is made connection with the reproducing method of the erasing type, in the previously mentioned FIG. 2, to speak precisely, the temperature at which the mask region 8 begins to be formed is not the Curie temperature Tc2 of the intermediate layer 4. The reproduction magnetic field Hre also participates with formation of the mask region 8. When a coercive force of the reproduction layer 5 is assumed as Hcl, and an exchange coupling force between the reproduction layer 5 and the recording layer 3 is Hw, the temperature at which the mask region 8 begins to be formed is a temperature to satisfy the following equation:

$$Hcl+Hw<Hre\ldots \quad (1)$$

The exchange coupling force Hw between the reproduction layer 5 the recording layer 3 becomes small according as the temperature increases, and becomes equal to zero at the Curie temperature Tc2 of the intermediate layer 4.

Figure 9:
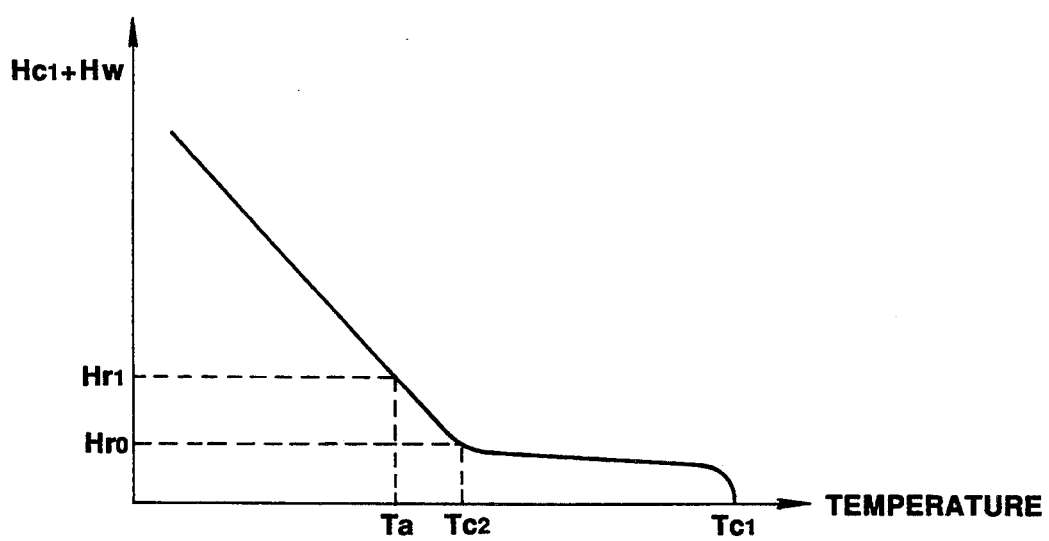
FIG. 9 is a view for explaining that the mask region is varied by changing an external magnetic field.

The plotted temperature characteristic of Hcl+Hw is as shown in FIG. 9. In this figure, Tc2 is the Curie temperature of the reproduction layer 5. At a temperature above the Curie temperature Tc2 of the intermediate layer 4, there results the same coercive force as that in the case where the reproduction layer 5 is comprised of a single layer.

In order to allow the directions of the reproduction layer 5 of the magneto-optical disc to be in correspondence with each other, it is sufficient to apply a magnetic field greater than Hcl+Hw as indicated by the above-mentioned equation (1). Accordingly, even in the same temperature distribution state, when a magnetic field HrO is applied as the reproduction magnetic field Hre in FIG. 9, the range above the Curie temperature Tc2 serves as the mask region 8. However, in the case where magnitude of the reproduction magnetic field Hre is Hr1, the range down to a temperature Ta lower than the Curie temperature Tc2 serves as the mask region 8. Namely, the dimension of the mask region varies in dependency upon the dimension of the reproduction magnetic field Hre. As a result, the dimension of the reproduction region varies.

Accordingly, by effecting a control to vary an external magnetic field, e.g., the reproduction magnetic field Hre in dependency upon the temperature of the magneto-optical disc 31, the reproduction region can be allowed to have a fixed dimension at all times.

Also in the case of the reproducing method of the recording pit raised type, by controlling the reproduction magnetic field in the same manner, the dimension of the reproduction region 18 can be a fixed value.

Further, while it is sufficient to respectively independently control the laser power or the external magnetic field, an approach may be employed to control the laser power and the external magnetic field at the same time.

Figure 10:
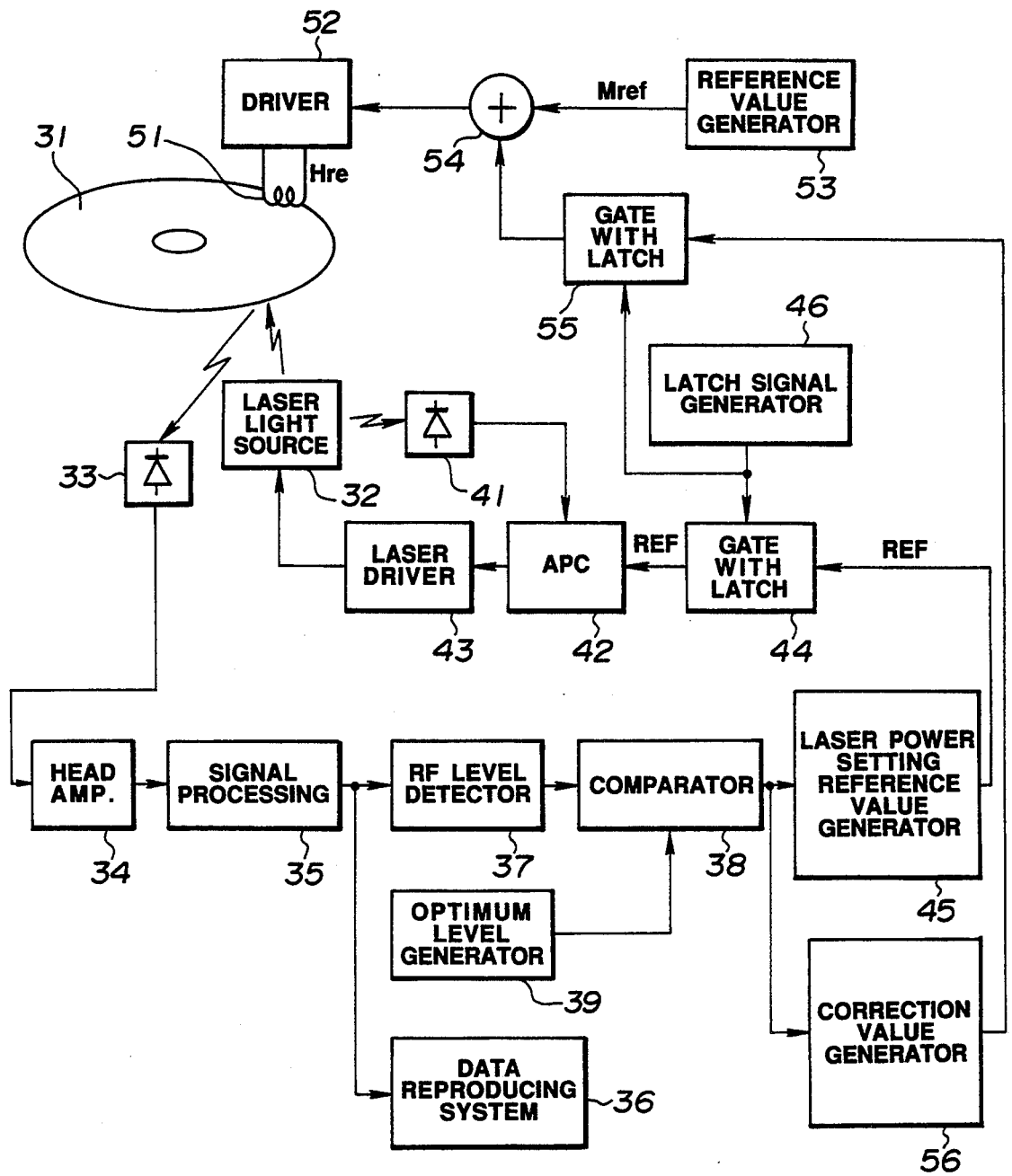
FIG. 10 is a block diagram showing another embodiment of a disc reproducing apparatus to which a reproducing method according to this invention is applied.

FIG. 10 is a block diagram showing an example of the essential part of a reproducing apparatus in the case of controlling the reproduction magnetic field and the output, laser power of the laser light source 32 in dependency upon a reproduced signal level of reference information.

In the case of this example, a reference value Mref from reference value generator 53 is delivered to an adding circuit or adder 54, at which it is added to a correction value from a gate circuit 55 with latch which will be described later. Then, a drive signal of the added value is delivered to the driver 52. Accordingly, when the correction value is zero, the magnitude of the reproduction magnetic field Hre takes a predetermined value corresponding to the reference value Mref. When the correction value takes other values, the magnitude of the reproduction magnetic field Hre varies with that predetermined value being as center in dependency upon the correction value.

In the case of this example, a correction value generator 56 for generating a correction value for correcting the magnitude of the reproduction magnetic field is provided. A compared error signal from the comparator 38 is delivered also to the correction value generator 56. A correction value from the correction value generator 56 is delivered to the gate circuit 55 with latch. When this control system is in the mode for reading out reference information, the gate circuit 55 is opened, so a closed loop is formed. Thus, by combination of the control of the external (reproduction) magnetic field and the control of the laser power, control is conducted so that a correction value for controlling the magnitude of a reproduction magnetic field Hre such that the level of a regenerative RF signal of reference information becomes equal to an optimum level is outputted from the correction value generator 56.

The correction value thus outputted is latched at the gate circuit 55 by a latch signal from the latch signal generator 46. Accordingly, at the time of reproduction of actual data which will be subsequently carried out, the regenerative laser power setting reference value REF latched at the gate circuit 44 and the correction value latched at the gate circuit 55 are used to carry out the control of the output power of the laser light source 32 and the control of the reproduction magnetic field Hre. Thus, the dimensions of the reproduction regions 9 and 18 are caused to be an optimum dimension.

In a manner stated above, in accordance with this invention, in carrying out the reproducing method of the erasing type or the high temperature type, the dimension of the reproduction region 9 or 18 is caused to be a predetermined dimension optimum for reproduction of the magneto-optical disc. Namely, even if the temperature of the magneto-optical disc varies by ambient environmental temperature, etc., it is possible stably accomplish the reproducing method of the erasing type or the high temperature type at all times irrespective of the disc temperature. The advantage with this invention in connection with the temperature of the magneto-optical disc can be also provided irrespective of whether the rotational drive system of the magneto-optical disc is CAV or CLV.

Namely, in the case where the rotation drive system of the magneto-optical disc is CLV, even if the reproducing position varies in a radial direction of the disc, the linear velocity and the track recording density do not change, but there are instances where the set linear velocity and the set track density may vary according to the kind of magneto-optical discs. In accordance with this invention, even if the linear velocity and/or the track recording density vary according to the kind of magneto-optical discs, a control is automatically conducted such that the dimensions of the reproduction regions 9 and 18 are caused to be an optimum value on the basis of reference information recorded on the disc. Accordingly, reproduction can be carried out in an optimum state corresponding to the linear velocity and the track recording density of the magneto-optical disc.

On the other hand, in the case where a magneto-optical disc is driven at CAV, the linear velocity will vary depending upon the reproducing position in a radial direction of the magneto-optical disc. If the above described embodiment is employed as it is, it is unable to eliminate the influence of changes in the linear velocity and the track recording density resulting from variation of the reproducing position in a radial direction of the disc.

However, even in the case where the rotational drive system of CAV is employed, if an approach is employed to record reference information similar to the above every respective tracks, or every necessary other plural tracks required to make settings of a laser power setting reference value REF and a correction value of the reproduction magnetic field in the same manner as previously described prior to reproducing those tracks or tracks in the vicinity thereof to latch those values thereafter to shift to actual data reproduction, the dimensions of the reproduction regions 9 and 18 can be allowed to be at all times an optimum dimension corresponding to a linear velocity at the reproducing position.

What is claimed is:

1. A method of reproducing information recorded on a magneto-optical recording medium, the medium including a recording layer, a reproduction layer and an intermediate layer having a Curie temperature which is less than the Curie temperatures of the recording layer and the reproduction layer and positioned between the recording layer and the reproduction layer, the recording layer and the reproduction layer being magnetically coupled through the intermediate layer in a steady state, wherein the method includes the steps of:

(a) rotating the recording medium with a predetermined speed of rotation;
 (b) while the recording medium is rotated with the predetermined speed, irradiating a reading light beam onto a region of the medium for heating a portion of the region irradiated by the light beam to a temperature which is less than the Curie temperatures of the recording layer and the reproduction layer but exceeding the Curie temperature of the intermediate layer to cause extinction of the magnetic coupling between the recording layer and the reproduction layer within the heated portion and thereby create a mask region which is shifted away from the region irradiated by the light beam in the direction of rotation of the medium, the mask region overlapping the region irradiated by the light beam;
 (c) detecting a Kerr rotational angle of a light reflected from the medium to derive the recorded information, including detecting the Kerr rotational angle of the light reflected by the region irradiated by the light beam except for the overlapped mask region;
 (d) prior to steps (a) and (b), reading out a signal recorded on the medium which signal is representative of an optimum size of the mask region, comparing the read out signal with a predetermined reference signal to produce a difference signal, and controlling the size of the mask region by controlling the intensity of the reading light beam using the difference signal as a control signal to minimize the difference signal.

2. A method of reproducing information recorded on a magneto-optical recording medium according to claim 1, wherein the step of controlling the size of the mask region further comprises the steps of applying a reproducing magnetic field to the medium and controlling the intensity of the reproducing magnetic field using the difference signal as a control signal to minimize the difference signal.

3. A method of reproducing information recorded on a magneto-optical recording medium, the medium including a recording layer, a reproduction layer and an intermediate layer having a Curie temperature which is less than the Curie temperatures of the recording layer and the reproduction layer and positioned between the recording layer and the reproduction layer, the recording layer and the reproduction layer being magnetically coupled through the intermediate layer in a steady state, wherein the method includes the steps of:

(a) rotating the recording medium with a predetermined speed of rotation;
 (b) while the recording medium is rotated with the predetermined speed, irradiating a reading light beam onto a region of the medium for heating a portion of the region irradiated by the light beam to a temperature exceeding the Curie temperature of the intermediate layer to cause extinction of the magnetic coupling between the recording and reproduction layers within the portion and thereby create a mask region which is shifted away from the region irradiated by the light beam in the direction of rotation of the medium, the mask region overlapping the region irradiated by the light beam;
 (c) detecting a Kerr rotational angle of a light reflected from the medium to derive the recorded information, including detecting the Kerr rotational angle of the light reflected by the region irradiated by the light beam except for the overlapped mask region;
 (d) prior to steps (a) and (b), reading out a signal recorded on the medium which signal is representative of an optimum size of the mask region, comparing the read out signal with a predetermined reference signal to produce a difference signal, and controlling the size of the mask region by applying a reproducing magnetic field to the medium and controlling the intensity of the reproducing magnetic field using the difference signal as a control signal to minimize the difference signal.

4. A method of reproducing information recorded on a magneto-optical recording medium, the medium including a recording layer, a reproduction layer, an intermediate layer between the recording layer and the reproduction layer, and a reproduction auxiliary layer having a Curie temperature which is less than the Curie temperatures of the recording layer, the reproduction layer, and the intermediate layer and positioned between the reproduction layer and the intermediate layer, with the direction of magnetization of the reproduction layer being initially uniform and the recording layer and the reproduction layer being magnetically decoupled by the reproduction auxiliary layer in a steady state, wherein the method includes the steps of:

(a) rotating the recording medium with a predetermined speed of rotation;

(b) while the recording medium is rotated with the predetermined speed, applying to the medium a reproducing magnetic field of a predetermined strength and irradiating a reading light beam onto a region of the medium for heating a portion of the region irradiated by the light beam to a temperature exceeding the Curie temperature of the intermediate layer to cause magnetic coupling between the recording and reproduction layers within the heated portion which is shifted away from the region irradiated by the light beam in the direction of rotation of the medium and thereby create a reproduction region in an area where the heated region overlaps the region irradiated by the light beam;

(c) detecting a Kerr rotational angle of a light reflected from the medium to derive the recorded information, including detecting the Kerr rotational angle of the light reflected by the reproduction region;

(d) prior to steps (a) and (b), reading out a signal recorded on the medium which signal is representative of an optimum size of the reproduction region, comparing the read out signal with a predetermined reference signal to produce a difference signal, and controlling the size of the reproduction region by controlling the intensity of the reading light beam using the difference signal as a control signal to minimize the difference signal.

5. A method of reproducing information recorded on a magneto-optical recording medium according to claim 4 wherein the step of controlling the size of the reproduction region further comprises the step controlling the intensity of the reproducing magnetic field using the difference signal as a control signal to minimize the difference signal.

6. A method of reproducing information recorded on a magneto-optical recording medium, the medium including a recording layer, a reproduction layer, an intermediate layer between the recording layer and reproduction layer, and a reproduction auxiliary layer having a Curie temperature which is less than the Curie temperatures of the recording layer, the reproduction layer, and the intermediate layer and positioned between the reproduction layer and the intermediate layer, with the direction of magnetization of the reproduction layer being initially uniform and the recording layer and the reproduction layer being magnetically decoupled by the reproduction auxiliary layer in a steady state, wherein the method includes the steps of:

(a) rotating the recording medium with a predetermined speed of rotation;

(b) while the recording medium is rotated with the predetermined speed, applying to the medium a reproducing magnetic field of a predetermined strength and irradiating a reading light beam onto a region of the medium for heating a portion of the region irradiated by the light beam to a temperature exceeding the Curie temperature of the intermediate layer to cause magnetic coupling between the recording and reproduction layers within the heated portion which is shifted away from the region irradiated by the light beam in the direction of rotation of the medium and thereby create a reproduction region in an area where the heated region overlaps the region irradiated by the light beam;

(c) detecting a Kerr rotational angle of a light reflected from the medium to derive the recorded information, including detecting the Kerr rotational angle of the light reflected by the reproduction region;

(d) prior to steps (a) and (b), reading out a signal recorded on the medium which signal is representative of an optimum size of the reproduction region, comparing the read out signal with a predetermined reference signal to produce a difference signal, and controlling the size of the reproduction region by controlling the intensity of the reproducing magnetic field using the difference signal as a control signal to minimize the difference signal.

* * * * *